A. A. LOW.
MEANS FOR SUPPLYING AIR TO HYDROCARBON MOTORS.
APPLICATION FILED OCT. 24, 1908.

926,756.

Patented July 6, 1909.

Witnesses:
Q. W. Gardner.
Ben Berg

Inventor:
Abbot Augustus Low
By his Attorney
Geo. Wm Miatt

UNITED STATES PATENT OFFICE.

ABBOT AUGUSTUS LOW, OF HORSESHOE, NEW YORK.

MEANS FOR SUPPLYING AIR TO HYDROCARBON-MOTORS.

No. 926,756. Specification of Letters Patent. Patented July 6, 1909.

Application filed October 24, 1908. Serial No. 459,334.

*To all whom it may concern:*

Be it known that I, ABBOT AUGUSTUS LOW, a citizen of the United States, residing at Horseshoe, St. Lawrence county, and State of New York, have invented certain new and useful Improvements in Means for Supplying Air to Hydrocarbon-Motors, of which the following is a specification.

My improvements relate to means for supplying air to the mixing chambers of hydrocarbon motors, particularly those used for marine purposes, where a gang or plurality of individual motors are arranged to operate in conjunction with each other. Heretofore each motor has been supplied with an individual stand pipe for this purpose.

My present invention consists essentially in connecting these several stand pipes by lateral conduits whereby the air is more readily and freely supplied to each motor in turn, and whereby the noise of the induction of the air is reduced to the minimum.

Figure 1:
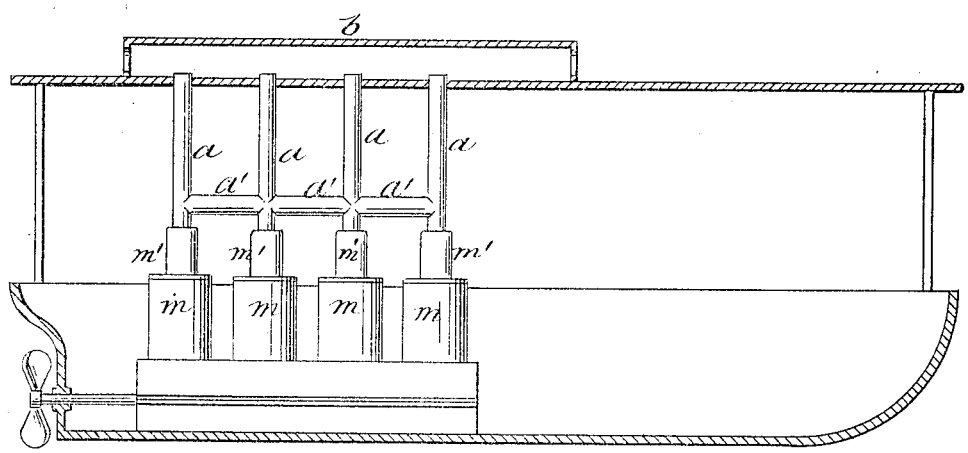
Figure 2:
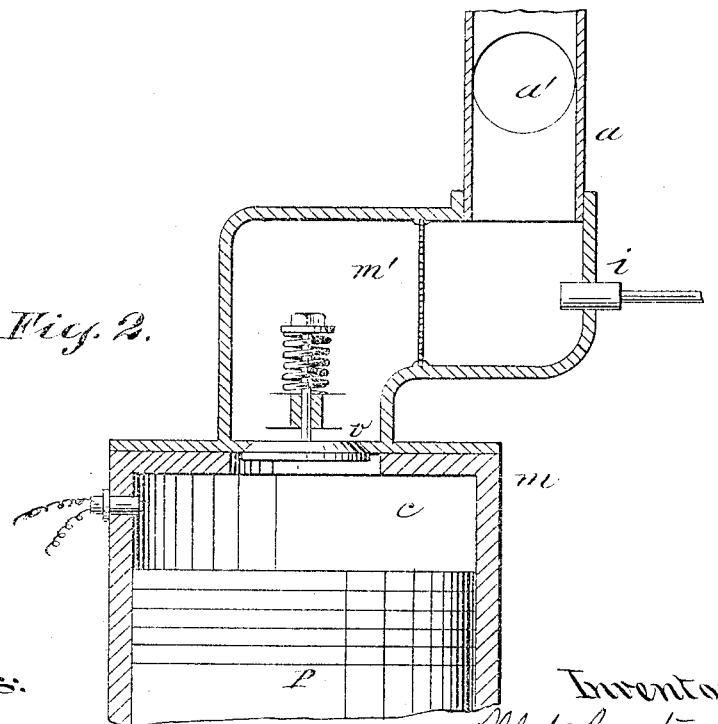

In the accompanying drawings, Figure 1, is a sectional elevation illustrating the application of my invention to a gang of marine motors; Fig. 2, is a sectional elevation on an enlarged scale of the upper part of one of the motors.

The motors $m, m, m, m$, are indicated symbolically, and may be of any desired type. Each is provided with a mixing chamber $m'$, in which air is charged with the hydrocarbon introduced through an injector $i$. This mixing chamber may be of various forms. In the drawings it is shown oblong in form, and is separated from the combustion chamber $c$, by air induction valve $v$, which yields during the retractile movement of the piston P, to admit the admixture of air and hydrocarbon.

Each mixing chamber has an air stand pipe $a$, extending upward to the air box or canopy $b$, which is used to exclude rain, dust and extraneous matter.

The air stand pipes $a$, are connected together by lateral conduits $a'$, near the mixing chambers $m'$, thus practically uniting all the stand pipes $a$, into a single air reservoir common to all the motors $m$. Under these conditions, it being understood that the motors are so timed that only one at a time inducts air, it is obvious that the individual motor has less resistance to overcome in sucking in air, since the air supply in all the pipes as a reservoir is available, whereas in the old form, where each stand pipe is separate and individual to its motor, the frictional resistance to the induction of air is so great as to impair the freedom of the air supply, the result being imperfect combustion, and inefficient work. In fact in practice under the old conditions, a motor even often missed firing a charge for lack of air to effect the combustion thereof. In other words, the lateral connections or conduits between the stand pipes act to relieve and obviate frictional resistance and tension of air supply, so that a free and ample quantity of air is admitted to each mixing chamber in succession thereby not only relieving the piston of back strain, but also insuring the perfect combustion of the charge, and thereby for both reasons increasing the efficiency of the motor. Furthermore, and of no little importance in use, this relief of internal tension or resistance in the air supply so materially reduces the sucking sound or noise of induction, as to render it imperceptible and unobjectionable. In fact, it practically eliminates this objectionable feature of hydrocarbon motors, and renders them noiseless in this respect.

What I claim as my invention and desire to secure by Letters Patent is,

1. A plurality or gang of hydrocarbon motors each provided with an air supply stand pipe, the individual stand pipes being connected together in proximity to the mixing chambers of the motors by lateral air conduits, for the purpose described.

2. A plurality or gang of hydrocarbon motors each provided with an air supply pipe connected with its mixing chamber, and with an elevated air box common to all, and lateral air conduits connecting the individual stand pipes together below said air box and in proximity to the mixing chambers of the motors, for the purpose described.

ABBOT AUGUSTUS LOW.

Witnesses:
D. W. GARDNER,
GEO. WM. MIATT.